United States Patent [19]

Jankowski et al.

[11] Patent Number: 5,340,124
[45] Date of Patent: Aug. 23, 1994

[54] SEAL RETENTION AND ANTI-ROTATION LOCKING ASSEMBLY

[75] Inventors: Richard B. Jankowski, South Bend; Robert F. Zvonar, Granger, both of Ind.

[73] Assignee: Allied-Signal Inc., Morristown, N.J.

[21] Appl. No.: 930,135

[22] Filed: Aug. 14, 1992

[51] Int. Cl.⁵ .............................................. F16J 15/32
[52] U.S. Cl. .................................... 277/136; 277/137; 277/38; 384/484
[58] Field of Search ............... 277/136, 137, 38, 47, 277/95, 166, 168, 169, 179, 181, 183, 189, 216, 220; 301/6.2; 384/140, 147, 482, 484

[56] References Cited

U.S. PATENT DOCUMENTS

| 802,530 | 10/1905 | Stephenson | 277/189 |
|---|---|---|---|
| 1,206,691 | 11/1916 | Frykman | 277/220 |
| 1,548,609 | 8/1925 | Justice | 277/220 |
| 2,353,988 | 7/1944 | Batesole et al. | 384/478 X |
| 2,886,347 | 5/1959 | Kupchick | 277/95 X |
| 2,945,707 | 7/1960 | Wasley | 277/95 X |
| 3,768,881 | 10/1973 | Bender et al. | |
| 4,544,168 | 10/1985 | Hans et al. | 277/166 X |
| 4,763,905 | 8/1988 | Zvonar | |
| 4,875,786 | 10/1989 | DeWachter | |

FOREIGN PATENT DOCUMENTS

| 17848 | 1/1930 | Australia | 277/136 |
|---|---|---|---|
| 194212 | 8/1991 | Japan | 277/136 |
| 97314 | 11/1939 | Sweden | 277/137 |
| 530933 | 12/1940 | United Kingdom | 277/136 |
| 551855 | 3/1943 | United Kingdom | 277/137 |

Primary Examiner—William A. Cuchlinski, Jr.
Assistant Examiner—Scott W. Cummings
Attorney, Agent, or Firm—Larry J. Palguta; Leo H. McCormick, Jr.; Robert A. Walsh

[57] ABSTRACT

A seal retention and anti-rotation locking assembly (20) is positioned within an aircraft wheel hub (10). The wheel hub (10) has a groove (26) disposed about the periphery of a central opening (12), the groove (26) receiving therein a complementary shaped single retaining ring (32). The retaining ring (32) is a split ring having first (33) and second (37) ends located adjacent one another. The first end (33) has a first increased axial width portion (34) with a recess (35) located therein and extending at an acute angle relative to a radius of the central opening (12). The second end (37) has a second increased axial width portion (38) located radially inwardly from the outer diameter (45) of the retaining ring (32) such that the second increased axial width portion (38) is located exteriorly of the groove (26). The groove (26) includes an enlarged axial portion (28) shaped complementary with and receiving the first increased axial width portion (34) to anchor circumferentially the retaining ring. A grease seal (40) extends between the periphery of the opening (12) and an axle member (14), and is secured circumferentially by an anchoring mechanism (50) which is coupled with a reinforcing member (22) of the grease seal (40). The anchoring mechanism extends axially and is received within the recess (35) of the first end (33) of the retaining ring (32), and thereby anchors circumferentially the grease seal (40) relative to the wheel hub (10) and central opening (12).

9 Claims, 1 Drawing Sheet

SEAL RETENTION AND ANTI-ROTATION LOCKING ASSEMBLY

The present invention relates generally to a seal retention assembly for a wheel, and in particular to a grease seal retention and anti-rotation locking assembly.

Aircraft wheels are typically mounted by means of roller bearings upon an aircraft axle. The roller bearings are lubricated with grease, and in order to retain the grease at the bearings, an annular seal extends radially inwardly between the periphery of the wheel hub opening and a stationary axle member. Prior constructions have suffered from the problem of an annular snap ring, which is utilized to hold the seal axially in place, bending or coning axially outwardly due to dynamic forces and permitting the grease seal to disengage and rotate in the wheel housing. Zvonar U.S. Pat. No. 4,763,905 discloses a seal retention and anti-rotation locking assembly which can effectively prevent rotation of the assembly. It is highly desirable to provide a simplified seal retention and anti-locking assembly which anchors the grease seal by means of a single member that, when coupled with the wheel, does not create any stress concentrations within the wheel. It is desirable that the entire assembly require as few parts as possible, be easily assembled and disassembled from the wheel, and reduce the cost of the assembly.

The present invention provides solutions to these problems by providing a seal retention and anti-rotation locking assembly in combination with a wheel, comprising a wheel hub of the wheel having a wheel opening, a groove disposed about the periphery of the opening and including an enlarged axial portion, a single retaining ring disposed within the groove and including reception means at an end thereof and the end having an increased axial width portion along a predetermined length thereof, the increased axial width portion received in the groove and the enlarged axial portion, sealing means disposed within the opening and extending radially between the periphery of said opening and a non-rotating axle men, her, the sealing means having a reinforcing member which includes receiving means, and anchoring means received fixedly within the receiving means and extending axially to the reception means of the retaining ring, so that the enlarged axial portion of the groove anchors circumferentially the retaining ring which, by means of the reception means and anchoring means, anchors circumferentially the sealing means.

One way of carrying out the invention is described in detail with reference to the drawings which illustrate an embodiment in which.

Figure 1:
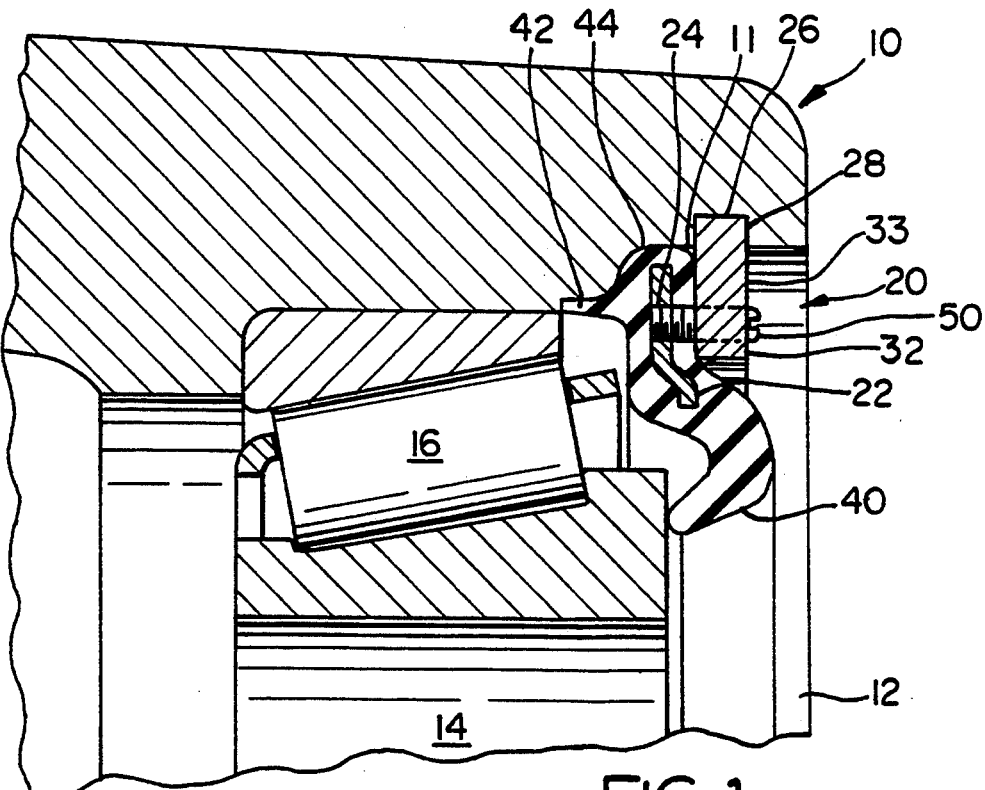
FIG. 1 is a partial section view of the wheel hub, axle member and bearing assembly, and seal retention and anti-rotation locking assembly.
Figures 2, 3:
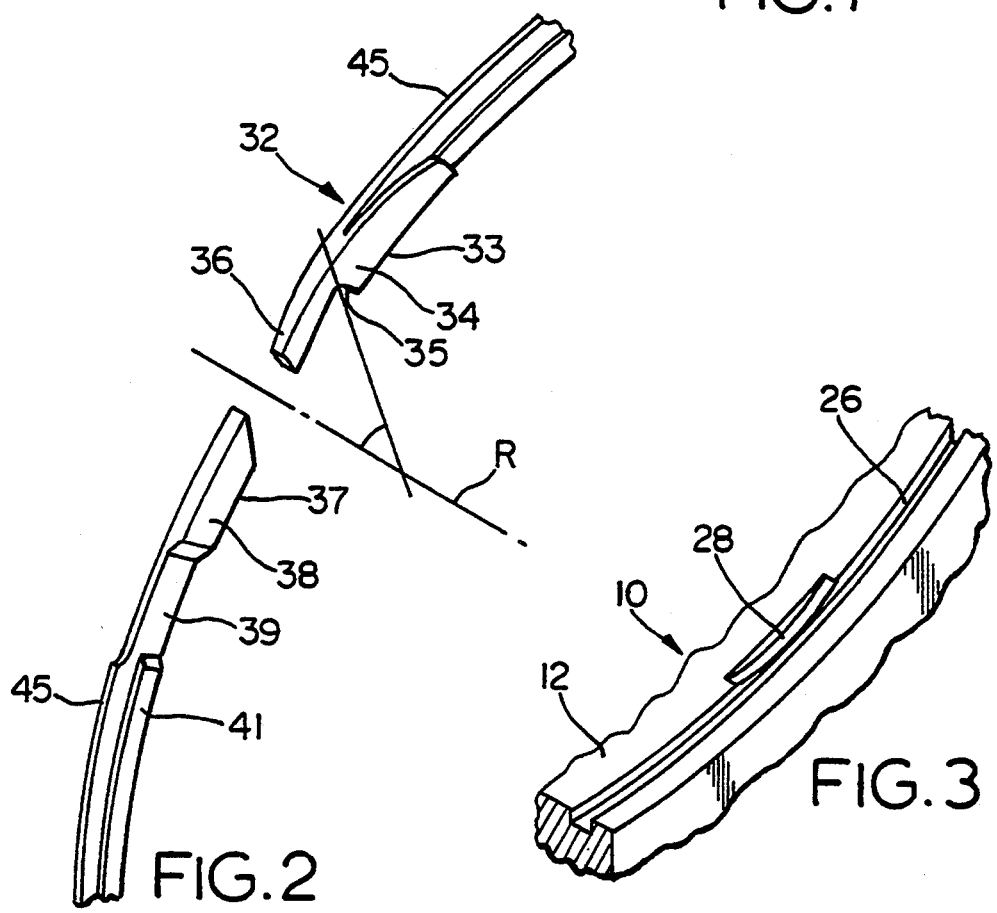
FIG. 2 is an isometric view of the retaining ring of the assembly.
FIG. 3 is an enlarged view of a portion of the groove of the wheel hub.

FIG. 1 illustrates in cross-section an aircraft wheel hub 10 that is circular in shape and which includes central opening 12. Disposed within the opening is a non-rotatable axle member 14, bearing means 16 and seal retention and anti-rotation locking assembly designated generally by reference numeral 20. Assembly 20 comprises annular seal 40 containing therein reinforcing member 22 which has threaded opening or receiving means 24. Annular grease seal 40 includes axially extending section 42 and radially outwardly extending section 44 which, when the seal is located within wheel opening 12, are compressed radially inwardly by engagement with shoulder 11 of hub 10. Located adjacent shoulder 11 is annular groove 26 which includes along one portion thereof an enlarged axial portion or area 28 (see FIG. 3). Axial portion 28 communicates with groove 26. Located within groove 26 is retaining ring 32 which is a single, split retaining ring having first end 33 and second end 37. First end 33 includes first increased axial width portion 34 which includes recess 35 disposed at an acute angle relative to radius R of ring 32 and wheel opening 12 (see FIG. 2). One side of reception means or recess 35 is defined by angled finger 36 of first increased axial width portion 34. Portion 34 is received within enlarged axial portion 28 of groove 26 when ring 32 is located within groove 26. Second end 37 of ring 32 comprises a second increased axial width portion 38 which extends via thin neck portion 39 to axially larger inner diameter section 41 of ring 32. Second increased axial width portion 38 of second end 37 is located radially inwardly of thinner outer diameter 45 of ring 32 such that when retaining ring 32 is located within groove 26 the second increased axial width portion 38 is located radially inwardly and outside of groove 26.

As illustrated in FIG. 1, locking or anchoring means 50 comprising a threaded screw member is received within threaded opening 24 of reinforcing ring 22 and extends axially to be received within recess or reception means 35 of ring 32.

The first increased axial width portion 34 of first end 33 is circumferentially seated within enlarged axial area 28 of groove 26 such that ring 32 cannot rotate circumferentially relative to hub 10 and central opening 12 during operation of the wheel when it is mounted upon an axle. Because anchoring means 50 is received and captured circumferentially within recess 35 of first end 33, seal 40 which is connected with anchoring means 50 cannot rotate relative to circumferentially restrained retaining ring 32. Thus, during operation of the wheel, which at high speeds may result in ovalization of the wheel, grease seal 40 remains in its mounted operational position as illustrated in FIG. 1, does not become disconnected relative to wheel hub 10, and will not rotate within opening 12, such that the assembly effectively prevents any loss of grease located at bearings 16 located between hub 10 and axle member 14.

We claim:

1. A seal retention and anti-rotation locking assembly in combination with a wheel, comprising a wheel hub of the wheel having a wheel opening, a groove disposed about the periphery of the opening and including an enlarged axial portion, a single retaining ring disposed within the groove and including reception means at an end thereof and the end having an increased axial width portion along a predetermined length thereof, the increased axial width portion received in the groove and enlarged axial portion, sealing means disposed within the opening and extending radially between the periphery of said opening and a non-rotating axle member, the sealing means having a reinforcing member which includes receiving means, and anchoring means received fixedly within the receiving means and extending axially to the reception means of the retaining ring, so that the enlarged axial portion of the groove anchors circumferentially the retaining ring which, by means of the reception means and anchoring means, anchors circumferentially the sealing means, the reception means comprising a recess disposed within said end, the recess extending at an angle relative to a radius of said wheel opening, the anchoring means being received and captured within said recess, and one side of the recess defined by a finger of the increased axial width portion and said recess extending at an acute angle relative to said radius.

2. The assembly in accordance with claim 1, wherein the anchoring means comprises a threaded screw member.

3. A seal retention and anti-rotation locking assembly in combination with an aircraft wheel, comprising a wheel hub of the wheel having a wheel opening, a groove disposed about the periphery of the opening and including an enlarged axial portion located adjacent and parallel to the groove, a split metallic retaining ring located within the groove and including therein a radially inwardly opening recess at one end of the ring, the one end of the ring having an increased axial width portion located at least partially within said enlarged axial portion of the groove, a sealing mechanism located within the interior opening and extending radially between the opening and a non-rotating member, the sealing mechanism including a reinforcing member which includes therein an opening, and a threaded screw member received within the opening of the reinforcing member and extending axially into the recess of the retaining ring, so that the enlarged axial portion of the groove anchors circumferentially the retaining ring which engages via the recess the threaded screw member in order to anchor circumferentially the sealing mechanism, and a radially outer peripheral portion of the retaining ring comprising a substantially thinner portion of the ring which is received within the groove.

4. A seal retention and anti-rotation locking assembly in combination with an aircraft wheel, comprising a wheel hub of the wheel having an interior opening, a groove disposed about the periphery of the opening and including an enlarged axial portion located adjacent and parallel to the groove, a split metallic retaining ring located within the groove and including therein a radially inwardly opening recess at one end of the ring, the one end of the ring having an increased axial width portion located at least partially within said enlarged axial portion of the groove, a sealing mechanism located within the interior opening and extending radially between the opening and a non-rotating member, the sealing mechanism including a reinforcing member which includes therein an opening, and a threaded screw member received within the opening of the reinforcing member and extending axially into the recess of the retaining ring, so that the enlarged axial portion of the groove anchors circumferentially the retaining ring which engages via the recess the threaded screw member in order to anchor circumferentially the sealing mechanism, and an opposite end of the retaining ring including adjacent thereto a thin neck portion permitting flexibility of the opposite end of the retaining ring.

5. The assembly in accordance with claim 4, wherein the opposite end of the retaining ring is located radially inwardly of said groove and comprises a second increased axial width portion.

6. The assembly in accordance with claim 5, wherein the thin neck portion is located circumferentially between the second increased axial width portion and an increased axial width inner diameter section of the retaining ring.

7. A seal retention and anti-rotation locking assembly in combination with an aircraft wheel, comprising a wheel hub of the wheel having an interior opening, a groove disposed about the periphery of the opening and including an enlarged axial portion located adjacent and parallel to the groove, a split metallic retaining ring located within the groove and including therein a radially inwardly opening recess at one end of the ring, the one end of the ring having an increased axial width portion located at least partially within said enlarged axial portion of the groove, a sealing mechanism located within the interior opening and extending radially between the opening and a non-rotating member, the sealing mechanism including a reinforcing member which includes therein an opening, and a threaded screw member received within the opening of the reinforcing member and extending axially into the recess of the retaining ring, so that the enlarged axial portion of the groove anchors circumferentially the retaining ring which engages via the recess the threaded screw member in order to anchor circumferentially the sealing mechanism, and one side of the recess defined by a finger of the increased axial width portion and the recess extending at an acute angle relative to a radius of said wheel opening.

8. A seal retention and anti-rotation locking assembly in combination with a wheel, comprising a wheel hub of the wheel having a wheel opening, a groove disposed about the periphery of the opening and including an enlarged axial portion, a single retaining ring disposed within the groove and including reception means at an end thereof and the end having an increased axial width portion along a predetermined length thereof, the retaining ring retained radially in a fixed, non-radially movable position in said groove by means of the radial resiliency of the ring, the increased axial width portion received in the groove and enlarged axial portion, sealing means disposed within the opening and extending radially between the periphery of said opening and a non-rotating axle member, the sealing means having a reinforcing member which includes receiving means, and anchoring means received fixedly within the receiving means and extending axially to the reception means of the retaining ring, so that the enlarged axial portion of the groove anchors circumferentially the retaining ring which, by means of the reception means and anchoring means, anchors circumferentially the sealing means.

9. A seal retention and anti-rotation locking assembly in combination with an aircraft wheel, comprising a wheel hub of the wheel having an interior opening, a groove disposed about the periphery of the opening and including an enlarged axial portion located adjacent and parallel to the groove, a split metallic retaining ring located within the groove and including therein a radially inwardly opening recess at one end of the ring, the retaining ring retained radially in a fixed, non-radially movable position in said groove by means of the radial resiliency of the ring, the one end of the ring having an increased axial width portion located at least partially within said enlarged axial portion of the groove, a sealing mechanism located within the interior opening and extending radially between the opening and a non-rotating member, the sealing mechanism including a reinforcing member which includes therein an opening, and a threaded screw member received within the opening of the reinforcing mechanism and extending axially into the recess of the retaining ring, so that the enlarged axial portion of the groove anchors circumferentially the retaining ring which engages via the recess the threaded screw member in order to anchor circumferentially the sealing mechanism.

* * * * *